US010125823B2

(12) United States Patent
Osgood (10) Patent No.: US 10,125,823 B2
(45) Date of Patent: Nov. 13, 2018

(54) COVER ASSEMBLY FOR THE CIRCULAR BEARING PORT OF A UNIVERSAL JOINT

(71) Applicant: Primetals Technologies USA LLC, Alpharetta, GA (US)

(72) Inventor: Peter N. Osgood, Westborough, MA (US)

(73) Assignee: PRIMETALS TECHNOLOGIES USA LLC, Alpharetta, GA (US)

( * ) Notice: Subject to any disclaimer, the term of this patent is extended or adjusted under 35 U.S.C. 154(b) by 705 days.

(21) Appl. No.: 14/817,571

(22) Filed: Aug. 4, 2015

(65) Prior Publication Data

US 2016/0061272 A1 Mar. 3, 2016

Related U.S. Application Data

(60) Provisional application No. 62/042,315, filed on Aug. 27, 2014.

(51) Int. Cl.
| | | |
|---|---|---|
| *F16D 3/16* | (2006.01) | |
| *B21B 35/14* | (2006.01) | |
| *F16D 3/41* | (2006.01) | |
| *F16D 3/38* | (2006.01) | |
| *F16D 3/84* | (2006.01) | |

(52) U.S. Cl.
CPC .............. *F16D 3/16* (2013.01); *B21B 35/142* (2013.01); *F16D 3/385* (2013.01); *F16D 3/41* (2013.01); *F16D 3/84* (2013.01)

(58) Field of Classification Search
CPC ............... F16D 3/16; F16D 3/385; F16D 3/41
See application file for complete search history.

(56) References Cited

U.S. PATENT DOCUMENTS

| | | | | |
|---|---|---|---|---|
| 2,773,368 A | * | 12/1956 | Slaght ................ | F16C 33/7809 403/57 |
| 3,606,566 A | * | 9/1971 | Bethke ................ | B23B 49/023 408/241 R |
| 4,505,689 A | | 3/1985 | Mazziotti | |
| 5,342,240 A | * | 8/1994 | Mazziotti ............... | F16C 19/48 464/11 |

(Continued)

FOREIGN PATENT DOCUMENTS

| | | |
|---|---|---|
| JP | H03-033120 | 9/1992 |
| JP | H10281173 A | 10/1998 |

(Continued)

OTHER PUBLICATIONS

The International Search Report and the Written Opinion issued in connection with corresponding PCT Application No. PCT/US2015/046723 dated Oct. 29, 2015.

(Continued)

*Primary Examiner* — Daniel J Wiley
(74) *Attorney, Agent, or Firm* — Gesmer Updegrove LLP (57) ABSTRACT

A cover assembly for a circular bearing port in the yoke of a universal joint comprises a plurality of separate cover segments configured and dimensioned for insertion into the port in positions coacting with each other to close the port. Each of the cover segments has an outer edge seated in a locking groove circumscribing an interior surface of the port. The cover segments are interconnected to form an integral circular cover, and the cover is rotationally fixed with respect to the yoke.

15 Claims, 6 Drawing Sheets

(56) References Cited

U.S. PATENT DOCUMENTS 5,746,658 A * 5/1998 Duggan ................. F16C 19/46
464/130
2013/0219688 A1 8/2013 O'Neill

FOREIGN PATENT DOCUMENTS

JP      H09-196083     11/1998
WO     2002/046522     6/2002

OTHER PUBLICATIONS

International Preliminary Report on Patentability issued by the International Bureau dated Mar. 9, 2017 in related International Application No. PCT/US2015/046723.
Office Action issued in co-pending Japanese Patent Application No. 2017-511711 dated Jul. 2, 2018.

* cited by examiner

Figure 13B

COVER ASSEMBLY FOR THE CIRCULAR BEARING PORT OF A UNIVERSAL JOINT

CROSS REFERENCE TO RELATED APPLICATION

This application claims priority from U.S. Provisional Application Ser. No. 62/042,315 filed Aug. 27, 2014, the entire contents and substance of which are herein incorporated by reference.

BACKGROUND

1. Field

Aspects of the present invention relate to a cover assembly for use in closing the circular bearing ports of universal joints of the type found in heavy industrial installations, in particular rolling mills.

2. Description of Related Art

FIGS. 1-4 illustrate a conventional universal joint 10. The universal joint includes four yoke half assemblies 12a-12d and a cross assembly 14 therebetween. The cross assembly includes four arms 16 rotatably supported by bearings 18 contained in bearing ports 20.

In conventional systems, the bearing ports 20 are open ended and closed by covers 22 having their rims secured to the yoke halves by bolts 24. Because of limited space, the bolts must be small for fitting and thus a rather large number of bolts are necessary. Under load, the yoke bearing ports tend to deform, causing the bolts to loosen or break.

Another conventional solution is to use large snap rings to hold the covers in place, but these can prove difficult to use, and the sharp grooves in which the snap rings are seated can be stress risers.

Yet another conventional solution is to configure the bearing ports as blind bores. The problem with this solution is the yoke becomes very thin over the bearing port and it can become a high stress area that has the tendency to break out.

Because of these limitations of the conventional solutions, the load capacity of the universal joint is limited and thus a new solution is needed.

SUMMARY

Briefly described, aspects of the present invention relate to cover assemblies used to close the circular bearing ports of universal joints. The universal joints are of the type employed in heavy industrial environments, in particular rolling mills.

In exemplary embodiments of the present invention, a cover assembly for a bearing port in the yoke of a universal joint may comprise a plurality of separate cover segments configured and dimensioned for insertion into the bearing port in positions coacting with each other to close the bearing port. Each of the cover segments has an outer edge seated in a locking groove circumscribing an interior surface of the bearing port. The cover segments are interconnected to thereby form an integral circular cover, and the cover is rotationally fixed with respect to the yoke.

The outer diameter of the integral circular cover is preferably smaller than the inner diameter of the locking groove.

The cover segments may be interconnected by a key secured by fasteners to each cover segment.

The cover assembly may be rotationally fixed relative to the yoke by a tab on the key, the tab being configured and arranged for seating in an anti-rotation notch in the interior surface of the bearing port.

The locking groove may have a rounded bottom, and the outer edges of the cover segments may have rounded shoulders seated in the locking groove.

A second groove may be provided in the rounded bottom of the locking groove, and a O-ring may be seated in the second groove. The O-ring may be resiliently compressible and may be configured and dimensioned to radially confine the integral circular cover.

The cover segments may include first and second segments closing opposite sides of the bearing port while allowing a gap to remain therebetween, a third segment closing a portion of the gap, and a fourth segment closing the remainder of the gap.

DETAILED DESCRIPTION

To facilitate an understanding of embodiments, principles, and features of the present invention, they are explained hereinafter with reference to implementation in illustrative embodiments. In particular, they are described in the context of being a cover for the circular bearing port of a heavy duty universal joint.

Embodiments of the present invention, however, are not limited to use in the described industrial application.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
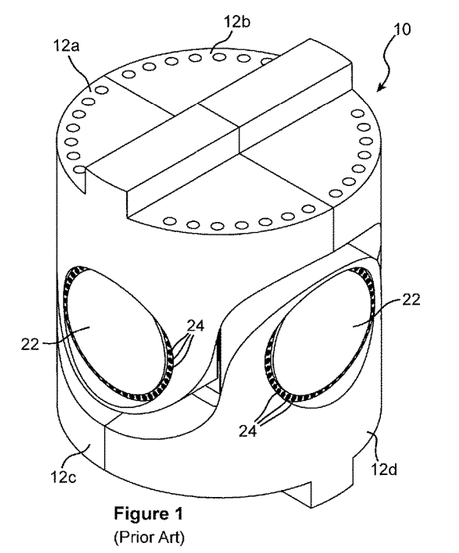
FIG. 1 is a perspective view of a universal joint having its bearing ports closed by conventional covers.
Figure 2:
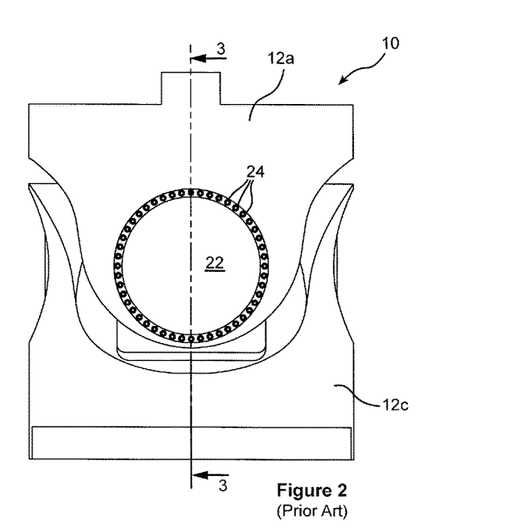
FIG. 2 is a side elevational view of the universal joint shown in FIG. 1.
Figure 3:
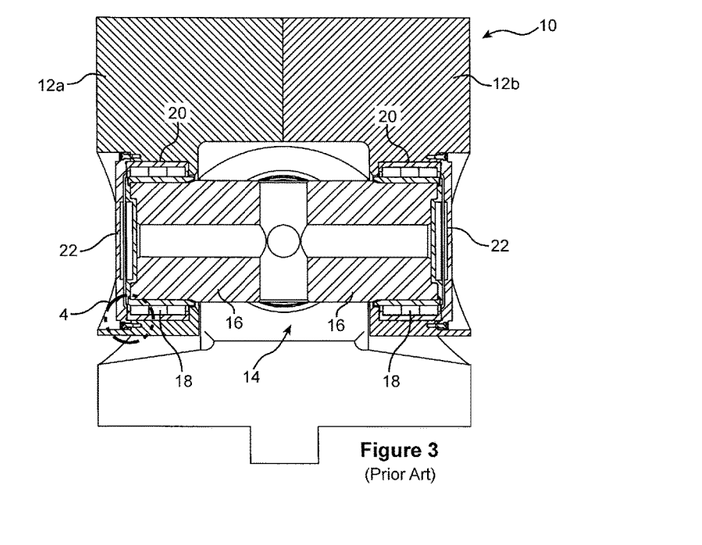
FIG. 3 is a sectional view taken on line 3-3 of FIG. 2.
Figure 4:
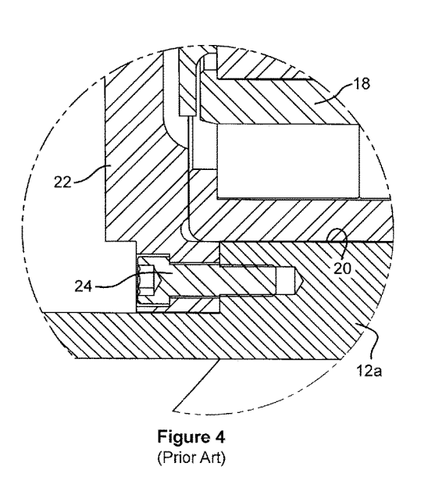
FIG. 4 is an enlarged partial sectional view of the circled portion shown in FIG. 3.
Figure 5:
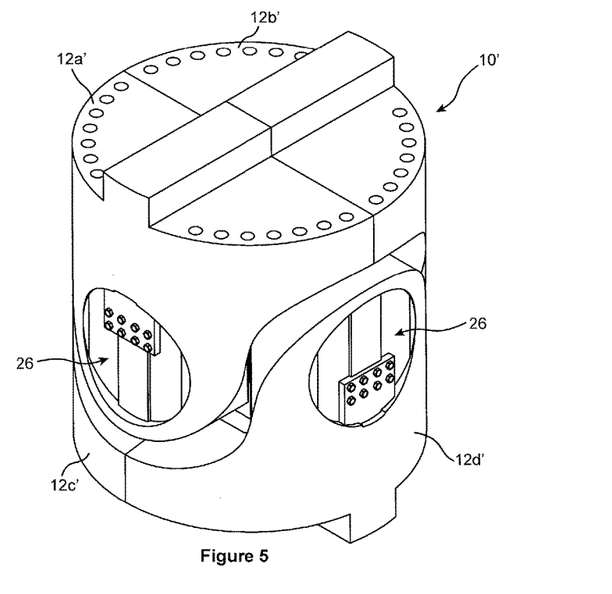
FIG. 5 is a perspective view of a universal joint having its bearing ports closed by a cover assembly in accordance with an exemplary embodiment of the present invention.
Figure 6:
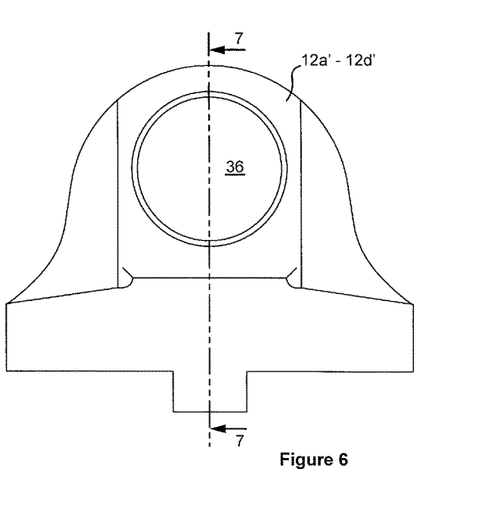
FIG. 6 is a side view of one of the yoke halves of the universal joint shown in FIG. 5.
Figure 7:
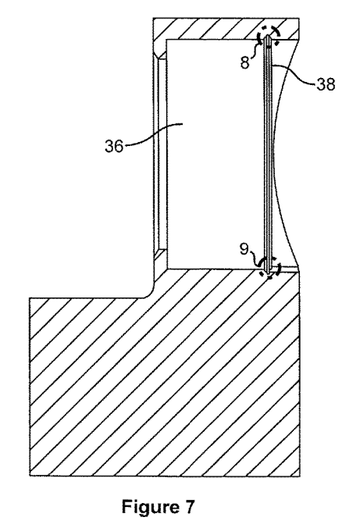
FIG. 7 is a cross sectional view taken along line 7-7 of FIG. 6, and showing the interior surface of the bearing port circumscribed by a locking groove in accordance with an exemplary embodiment of the present invention.
Figure 8:
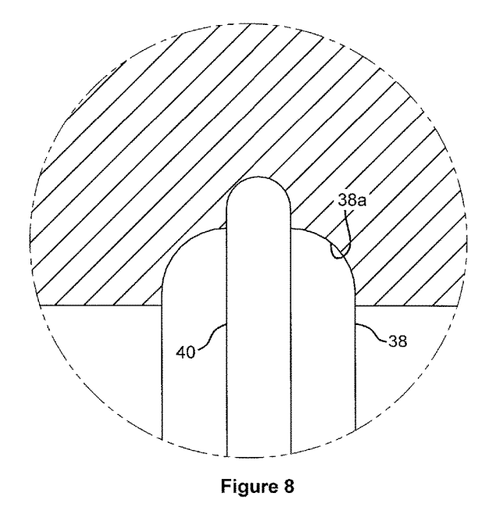
FIGS. 8 and 9 are enlarged partial cross sectional views of circled portions shown in FIG. 7.

FIG. 5 illustrates a universal joint 10', again including four yoke half assemblies 12a'-12d', with the bearing ports of the yoke assemblies closed by cover assemblies 26 in accordance with an exemplary embodiment of the present invention.

Figure 10:
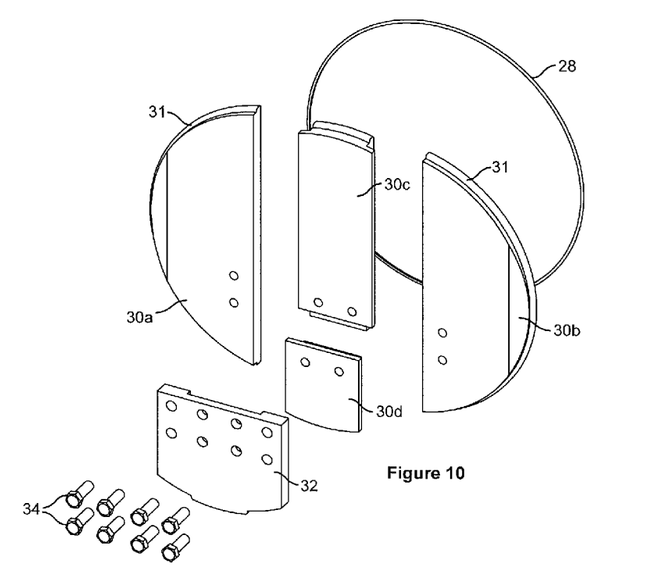
FIG. 10 is an exploded view of components making up a cover in accordance with an exemplary embodiment of the present invention.

With reference to FIG. 10, the cover assemblies 26 preferably comprise an O-ring 28, first and second cover segments 30a, 30b, a third cover segment 30c, a fourth cover segment 30d, a key 32, and multiple fasteners indicated typically at 34. The outer edges of the cover segments 30a-30d are formed with rounded shoulders 31.

Figure 9:
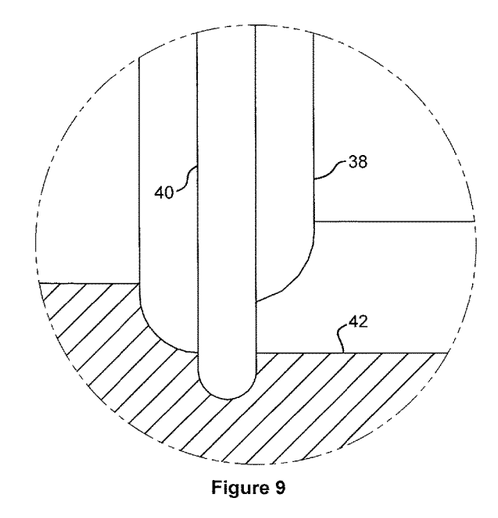

As shown in FIGS. 6-9, each yoke half assembly has an open ended circular bearing port 36 with its interior surface circumscribed by a locking groove 38. The locking groove has a rounded bottom 38a interrupted by a second groove 40. At one location, as depicted in FIG. 9, groove 38 is intersected by an anti-rotation notch 42.

Installation of the cover assembly 26 is achieved by the following sequential steps:

The O-ring 28 is seated in the second groove 40.

Figure 11A:
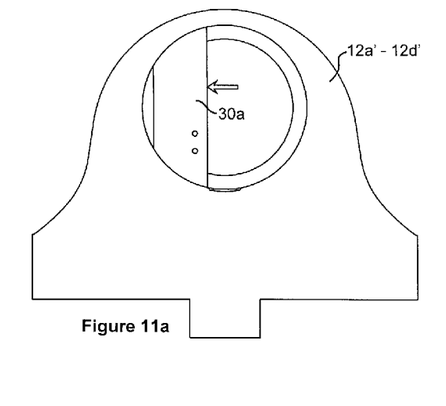
FIGS. 11A-11E are schematic illustrations depicting sequential steps in the installation of a cover assembly in accordance with an exemplary embodiment of the present invention.

As shown in FIG. 11A, the first cover segment 30a is positioned on one side of the bearing port.

Figure 11B:
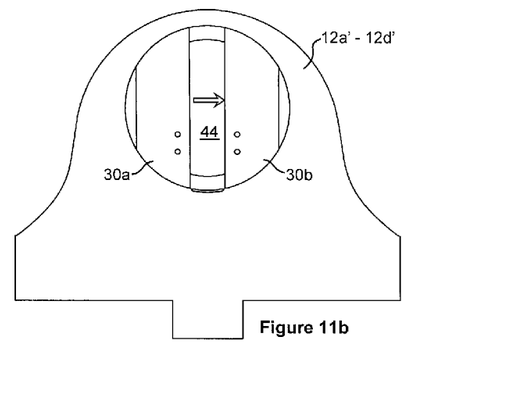

As shown in FIG. 11B, the second cover segment 30b is positioned on the opposite side of the bearing port. The first and second cover segments being configured and dimensioned to define a gap 44 therebetween.

Figure 11C:
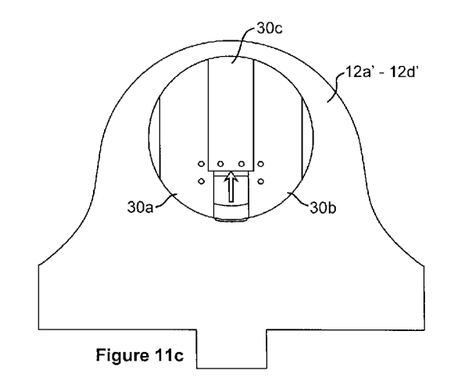

As shown in FIG. 11C, the third cover segment 30c is positioned to close a portion of the gap 44.

Figure 11D:
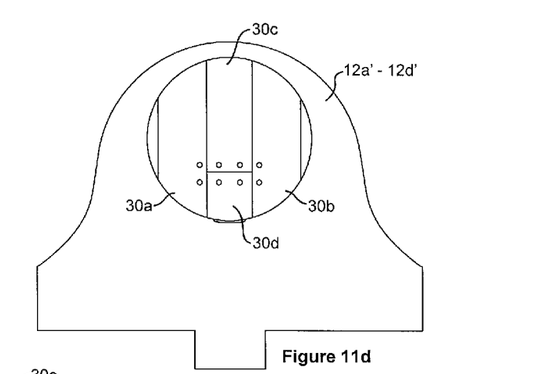

As shown in FIG. 11D, the fourth cover segment 30d is positioned to close the remainder of gap 44.

Figure 11E:
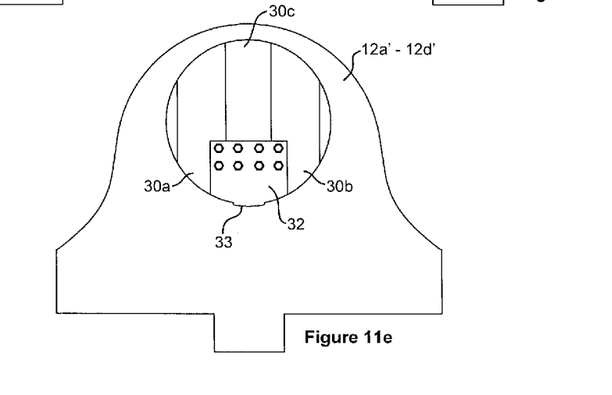

As shown in FIG. 11E, the key 32 is then secured to all of the cover segments, thereby interconnecting them into an integral cover. The key 32 includes a tab 33 configured and arranged for seating in the anti-rotation notch 42, thus rotationally fixing the cover assembly with respect to the yoke half.

Figure 12A:
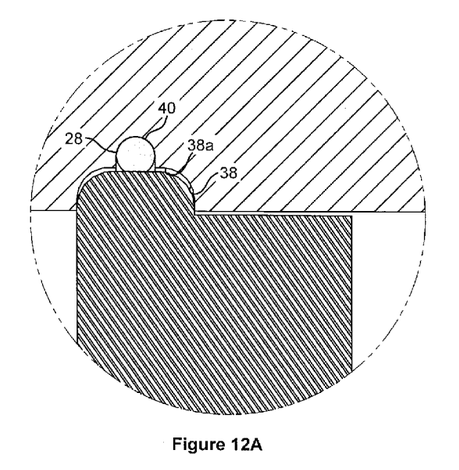
FIGS. 12A-12B are enlarged cross sectional views showing the seating of the outer edges of the cover segments in the locking groove and against the O-ring, in accordance with an exemplary embodiment of the present invention.
Figure 12B:
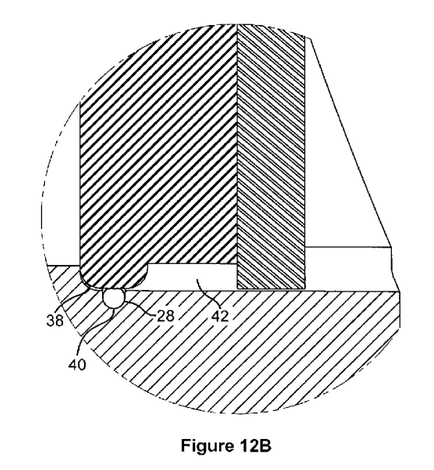

As can be best seen in FIGS. 12a and 12b, the rounded shoulders 31 on the outer edges of the cover segments 30a-30d are received in the locking groove 38. The outer diameter of the integral cover is preferably slightly smaller than the inner diameter of the locking groove 38.

The O-ring 28 projects radially inwardly from the rounded bottom 38a of the locking groove 38. The outer circular edge of the integral cover is in contact with and thus radially supported by and confined within the O-ring. The resilient compressibility of the O-ring allows the integral cover to "float" radially with respect to the yoke half, thereby isolating the fasteners 34 securing the key 32 to each cover segment from damaging stresses resulting from distortion of the bearing port under load.

Figure 13A:
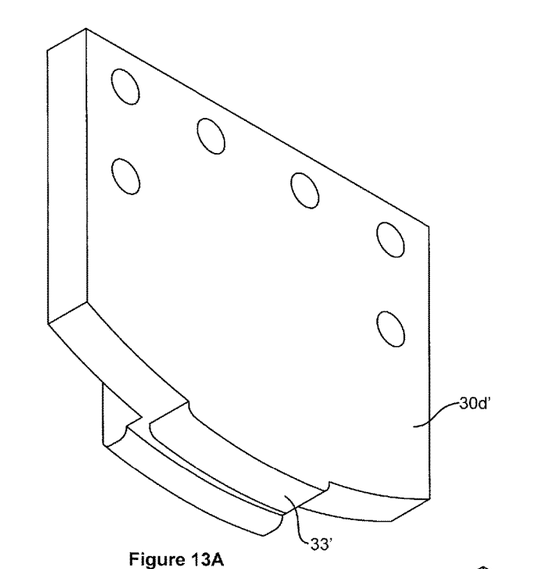
FIGS. 13A and 13B are front and back perspective views of a modified cover segment configured to interconnect with the other cover segments and to rotationally fix the cover assembly, in accordance with an exemplary embodiment of the present invention.
Figure 13B:
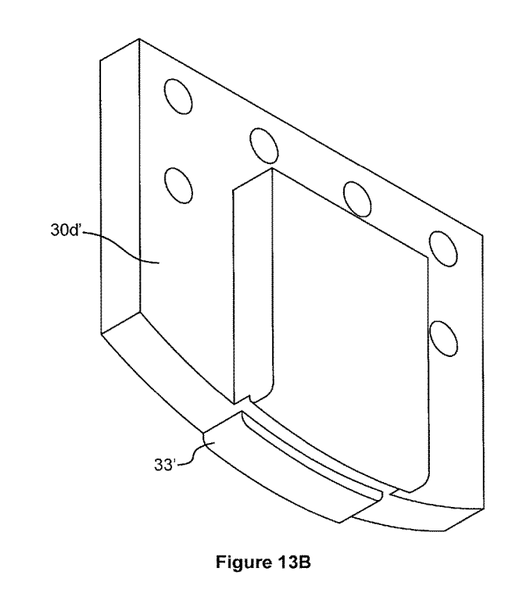

Referring now to FIGS. 13A and 13B, it will be seen that a fourth cover segment 30d' may be provided with an array of openings accommodating fasteners to secure it to the other cover segments, and with a tab 33' configured and arranged for receipt in the anti-rotation notch 42. With this arrangement, the fourth cover segment also serves as a key.

In light of the foregoing, it will be evident to those skilled in the art that modifications may be made to the exemplary embodiment herein disclosed without departing from the scope of the present invention as defined by the appended claims. For example, the integral cover could be made up of a different number of differently configured cover segments, and the integral cover could be provided with an outer diameter substantially equal to the inner diameter of the locking groove.

What is claimed is:

1. A universal joint comprising:
at least one yoke comprising a circular bearing port in the yoke; a cover assembly comprising:
a plurality of separate cover segments configured and dimensioned for insertion into said port in positions co-acting with each other to close said port, each of said cover segments having an outer edge seated in a locking groove circumscribing an interior surface of said port;
means for interconnecting said cover segments to thereby form an integral circular cover and;
means for rotationally fixing said cover with respect to said yoke.

2. The universal joint of claim 1 wherein the outer diameter of said integral circular cover is smaller than the inner diameter of said locking groove.

3. The universal joint of claim 2 wherein said locking groove has a rounded bottom, and wherein the outer edges of said cover segments have rounded shoulders seated in said locking groove.

4. The universal joint of claim 3 further comprising a second groove in the rounded bottom of said locking groove, and an O-ring seated in said second groove, said O-ring being resiliently compressible and being configured and dimensioned to radially confine said integral circular cover.

5. The universal joint of claim 1 wherein said mean for interconnecting said cover segments comprises a key secured by fasteners to each cover segment.

6. The universal joint of claim 5 wherein said means for rotationally fixing said cover comprises a tab on said key, said tab being configured and arranged for seating in an anti-rotation notch in the interior surface of said bearing port.

7. The universal joint of claim 5 wherein said key comprises an integral part of one of said cover segments.

8. The universal joint of claim 1 wherein said integral circular cover comprises:
first and second cover segments closing opposite sides of said bearing port, said first and second cover segments being configured and dimensioned to define a gap therebetween;
a third cover segment closing a portion of said gap; and
a fourth cover segment closing the remainder of said gap.

9. A method of closing a circular bearing port in a yoke of a universal coupling, said method comprising:
providing a locking groove circumscribing an interior surface of said port;
inserting a plurality of cover segments into said port in positions co-acting with each other to close said port, each of said cover segments having an outer edge seated in said locking groove;
interconnecting said cover segments to thereby form an integral circular cover; and
rotationally fixing said cover with respect to said yoke.

10. The method of claim 9 wherein said integral circular cover is formed by fastening a key to all of said cover segments.

11. The method of claim 10 wherein said integral circular cover is rotationally fixed to said yoke by seating a tab on said key in an anti-rotation notch in the interior surface of said port.

12. The method of claim 9 further comprising providing said integral circular cover with and outer diameter smaller than the inner diameter of said locking groove.

13. The method of claim 12 further comprising providing said locking groove with a rounded bottom and providing the outer edges of said cover segments with rounded shoulders seated in the rounded bottom of said locking groove.

14. The method of claim 13 further comprising providing the rounded bottom of said locking grooves with a second groove containing a resiliently compressible O-ring radially confining said integral circular cover.

15. The method of claim 9 wherein said cover segments are inserted into said port in the following sequence:
- a first cover segment closing one side of said port;
- a second cover segment closing an opposite side of said port, said first and second cover segments being configured and dimensioned to define a gap therebetween;
- a third cover segment closing a portion of said gap; and
- a fourth cover segment closing the remainder of said gap.

* * * * *